United States Patent
McKee

(10) Patent No.: US 6,575,118 B1
(45) Date of Patent: Jun. 10, 2003

(54) VALVE ASSEMBLY

(76) Inventor: William Douglas McKee, 17 Homelands Avenue, Feilding (NZ)

( * ) Notice: Subject to any disclaimer, the term of this patent is extended or adjusted under 35 U.S.C. 154(b) by 0 days.

(21) Appl. No.: 09/673,670

(22) PCT Filed: May 6, 1999

(86) PCT No.: PCT/NZ99/00057

§ 371 (c)(1), (2), (4) Date: Jan. 2, 2001

(87) PCT Pub. No.: WO99/56532

PCT Pub. Date: Nov. 11, 1999

(30) Foreign Application Priority Data

May 7, 1998 (NZ) ................................. 330381

(51) Int. Cl.$^7$ .............................................. A01K 9/00
(52) U.S. Cl. ........................................................ 119/71
(58) Field of Search ................... 119/71, 72; 215/11.1, 215/11.4; 606/236

(56) References Cited

U.S. PATENT DOCUMENTS

| | | | | |
|---|---|---|---|---|
| 2,442,656 A | * | 6/1948 | Less ........................... | 215/11.4 |
| 2,502,262 A | * | 3/1950 | Labiche ....................... | 4/362 |
| 2,522,757 A | * | 9/1950 | Larson ......................... | 119/71 |
| 2,579,339 A | * | 12/1951 | Rose-Miller .................. | 119/71 |
| 2,722,217 A | * | 11/1955 | Rose-Miller .................. | 119/71 |
| 2,747,573 A | * | 5/1956 | Schaich ....................... | 215/11.4 |
| 2,876,772 A | * | 3/1959 | Witz ........................... | 215/11.4 |
| 2,995,596 A | * | 8/1961 | Rose-Miller .................. | 252/77 |
| 3,698,952 A | * | 10/1972 | Rose-Miller .................. | 119/71 |
| 3,703,159 A | * | 11/1972 | Rose-Miller .................. | 119/496 |
| 3,800,825 A | * | 4/1974 | Zoll ............................ | 119/72.5 |
| 4,135,513 A | * | 1/1979 | Arisland ....................... | 137/494 |
| 4,406,253 A | * | 9/1983 | Atchley et al. ............... | 119/72.5 |
| 5,638,769 A | * | 6/1997 | McIntyre et al. .............. | 119/71 |
| 5,667,084 A | * | 9/1997 | Duggal et al. ................ | 215/11.4 |

FOREIGN PATENT DOCUMENTS

| | | |
|---|---|---|
| EP | 0126667 A1 | 11/1984 |
| FR | 1424855 | 12/1965 |
| FR | 2296371 | 7/1976 |
| FR | 2307463 | 11/1976 |
| FR | 2498418 A | 7/1982 |
| GB | 673680 | 6/1952 |
| GB | 696527 | 9/1953 |
| GB | 1498070 | 1/1978 |
| GB | 2267549 A | 12/1993 |
| NZ | 35868 | 2/1915 |
| NZ | 39125 | 8/1917 |
| NZ | 102401 | 6/1950 |
| NZ | 110435 | 10/1953 |
| WO | WO89/11218 | 11/1989 |

OTHER PUBLICATIONS

Derwent Abstract Accession No. B2100 D/07, DD 144704 A (Gartner), Nov. 5, 1980.

* cited by examiner

Primary Examiner—Charles T. Jordan
Assistant Examiner—Jordan M Lofdahl
(74) Attorney, Agent, or Firm—Jacobson Holman PLLC

(57) ABSTRACT

A valve assembly for use in an animal feeding teat and an animal feeding teat in combination with the above valve assembly. The valve assembly includes a piston shaft with a piston head, a valve head attached to the piston shaft at the end of the shaft opposite the piston head, and a biasing structure co-operable with the piston head, so that in use in an animal feeding teat the valve head is seated to cover a first aperture in the teat and pressure on the piston head against the biasing structure will unseat the valve head and open the aperture.

13 Claims, 1 Drawing Sheet

VALVE ASSEMBLY

FIELD OF THE INVENTION

This invention relates to a valve assembly.

The valve assembly of an embodiment of the present invention is particularly adapted to be used within an animal feeding teat. However, other uses of the valve assembly of the present invention are also contemplated.

BACKGROUND TO THE INVENTION

Traditionally animal feeding teats operate by the feeding animal sucking on the teat to start the flow of liquid. The disadvantage of such teat assembly is that if the opening in the nipple of the teat becomes ripped or broken, the liquid will spill out of the teat even when the animal is not sucking on the teat. Other traditional teats also have the disadvantage that once liquid is flowing through the teat, it will only stop once all the liquid is emptied from the receptacle the teat is attached to. This can cause the animal feeding from the teat to choke on the liquid, or allow spillage and waste of liquid.

Another disadvantage of many traditional feeding teat assemblies is that if the animal pulls the teat to one side, liquid will not flow through the teat. Such teats need to be kept substantially in line with the liquid outlet to operate.

Some teats known in the art contain a valve assembly which operates under the force of gravity to close the valve once it has been opened. The disadvantage of such a teat valve assembly is that it will only operate effectively if the teat is substantially vertical to the ground.

One such invention is described in NZ 110 435. This patent discloses a tubular nozzle that is attached to a container and fitted with an internal rubber covered valve. The free peripheral edge of the nozzle is formed into an upturned flange with curled portion of a flexible teat fitting over and between the flange and the perpendicular wall of the nozzle, with a portion of the teat lying flat against the wall to make an airtight seal. The valve is gravity operated and the teat must be hanging vertically or near vertically for the valve to close.

The invention described in NZ 102 401 is a tubular nozzle fitted to the lower end of a food containing vessel with a resilient teat attached to its end. Inside the nozzle is a valve which consists of a metallic ball-head with a depending stem to the lower end of which is fitted a rubber knob. When an animal sucks the teat, the valve is displaced upwardly and liquid can flow through the teat. When the animal releases the teat, the valve is closed by gravity and no liquid can flow. This construction is also limited to use where the teat hangs vertically or near vertically.

The invention described in NZ 39 125 comprises a containing-vessel for a liquid with a concave or sloping bottom, an angular outlet with a rubber teat at the end thereof for an animal to suck. Within the vessel is a float valve, which may be closed against its seat by the operation of a float or by hand.

In NZ 35 868, there is described a means employed for feeding calves and the like with liquid food. According to this invention, a reservoir for the liquid has a false bottom in which is a valve adapted to close by gravity. A sliding tray beneath the bottom is provided with a float upon one end of a pivoted lever, the other end of which engages a downwardly projecting stem of the valve. The liquid in the tray is thus kept at a predetermined level by the rise and fall of the float. A branch pipe from the tray is connected by a rubber tube or similar flexible connector with a running-pipe supplying the liquid to the animals. Wastage is prevented by locating the orifices from the pipe to the teats on a level with, or slightly higher than, the surface of the liquid in the tray.

The invention in U.S. Pat. No. 5,638,769 discloses a teat comprising a hollow body made of a resilient material. The body has an inlet and an outlet end. The outlet end includes at least one slit through the wall of the body. This slit(s) does not extend into that area of the wall of the body which forms the extremity of the outer end. Engaged with the inlet end is a valve biased by a spring. As an animal suckles on the teat a pressure differential forms within. This suction causes the valve to open allowing liquid to fill the teat. When the suction is removed the valve closes. The closed valve prevents any backflow when the teat is squeezed.

GB 2 267 549 discloses a teat valve comprising an apertured closure member which co-operates with a tubular seat and an elastic sleeve which houses both the member and the seat and urges them into sealing engagement. When the sleeve is stretched, the valve opens allowing passage of liquids/solubles and gases, and when released returns to its original position, thus closing the valve.

It is an object of the present invention to provide a valve assembly adapted for use in an animal feeding teat which will go some way towards overcoming the above-mentioned disadvantages or which will at least provide the public with a useful choice.

DISCLOSURE OF INVENTION

This invention can be said broadly to consist in a valve assembly adapted for use in an animal feeding teat, said valve assembly comprising a piston shaft with a piston head, a valve head attached to the piston shaft at the end of the shaft opposite the piston head, and biasing means co-operable with said piston head, so that in use in an animal feeding teat said valve head is seated to cover a first aperture in said teat and pressure applied by said animal on said teat causes said teat to act directly on said piston head to move said valve assembly against said biasing means to unseat said valve head and open said aperture.

Preferably the piston head is bulbous in shape.

Preferably the piston head is tapered at the end remote from the valve head.

Preferably the biasing means is a spring.

Preferably the spring is a coil spring.

Most preferably the spring is comprised of stainless steel.

Preferably the spring is coiled around the piston shaft.

Preferably the piston head contains at least one recess.

Preferably the piston shaft, piston head and valve head are formed as one unit. Preferably that unit is comprised of nylon.

The invention can also be said broadly to consist in a combination of an animal feeding teat with the valve assembly described above.

Preferably the teat comprises:

an outer casing, a first aperture at one end of the casing connectable to a source of fluid, through which the valve head of the valve assembly protrudes, and at least one second aperture in the outer casing through which liquid can flow to feed the animal, whereby when pressure is applied onto the piston head, the valve head is unseated from the first aperture to allow fluid to flow through the first aperture into the outer casing and subsequently out of the second aperture and closes when the pressure is removed from said piston head.

In one alternative the pressure is applied by an animal's mouth or teeth through said outer casing. In another alternative the pressure is applied by the atmosphere on the outer casing when an animal sucks on the teat thereby creating a partial vacuum within the teat.

Preferably the second aperture is located at the opposite end of the casing from the end where the valve head protrudes.

Preferably the teat is comprised of either a durable pliant synthetic material or rubber. The rubber may be natural or synthetic.

The invention may further be said to broadly consist in an animal feeding teat adapted to allow incorporation of the valve assembly described above.

The invention may also be said broadly to consist in a valve assembly substantially as herein described with reference to the accompanying drawings.

The invention may also be said to broadly consist in an animal feeding teat substantially as herein described with reference to the accompanying drawings.

The invention may also be said broadly to consist in a combination substantially as herein described with reference to the accompanying drawings.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

This invention consists in the foregoing and also envisages constructions of which the following gives examples.

DETAILED DESCRIPTION OF THE INVENTION

One preferred form of the present invention will now be described with reference to the accompanying drawings in which.

Figure 1:
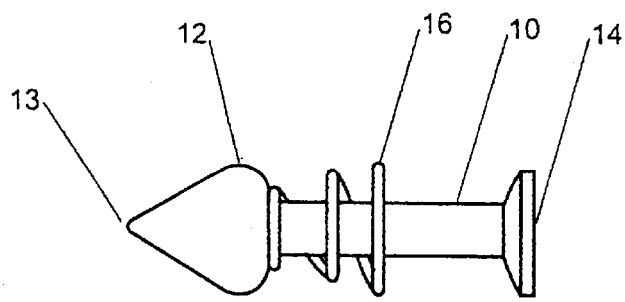
FIG. 1 shows a side elevational view of the valve assembly of the present invention.
Figure 4:
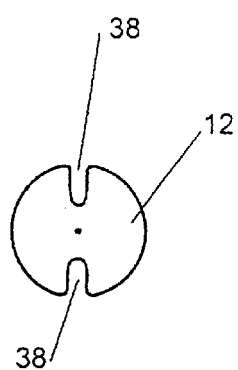
FIG. 4 is an end elevational view of the piston head viewed from the left side of FIG. 1.

In the preferred form of the invention shown in FIG. 1, the valve assembly is comprised of a piston shaft 10 with a piston head 12 attached. In a preferred form of the invention the piston head 12 is bulbous, tapered to a point 13 and contains two recesses (38, 38) that assist in the flow of fluid through the teat. A valve head 14 is connected to the piston shaft 10, at the opposite end of the shaft 10 from the piston head 12. A biasing means 16 rests against the piston head 12 and is located along the piston shaft 10. Preferably the biasing means 16 is a spring. Preferably the spring is a coil spring. Most preferably the spring is comprised of stainless steel.

Optionally, the piston head 12, piston shaft 10 and valve head 14 may be moulded as one piece of material. The material is preferably nylon but any other inert rigid material would be suitable.

Figure 2:
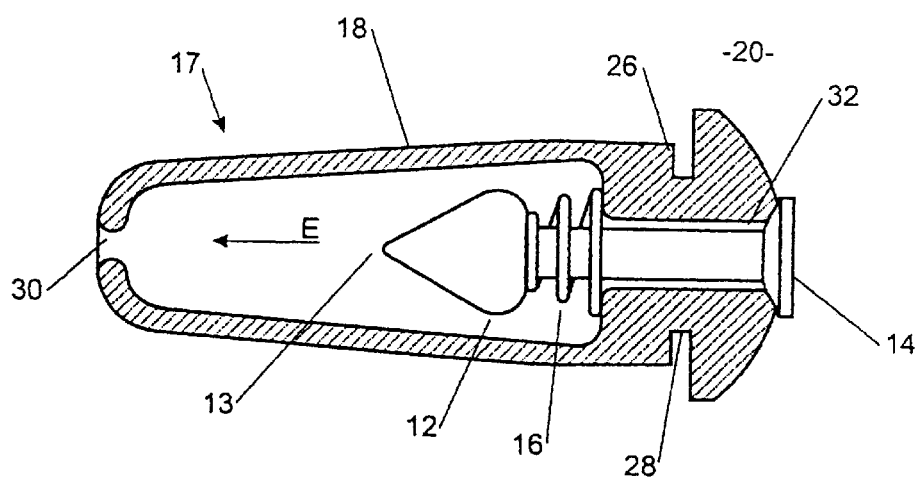
FIG. 2 shows a sectional side elevation view of the valve assembly of the present invention when located inside a teat and wherein the valve head is in a closed position.
Figure 3:
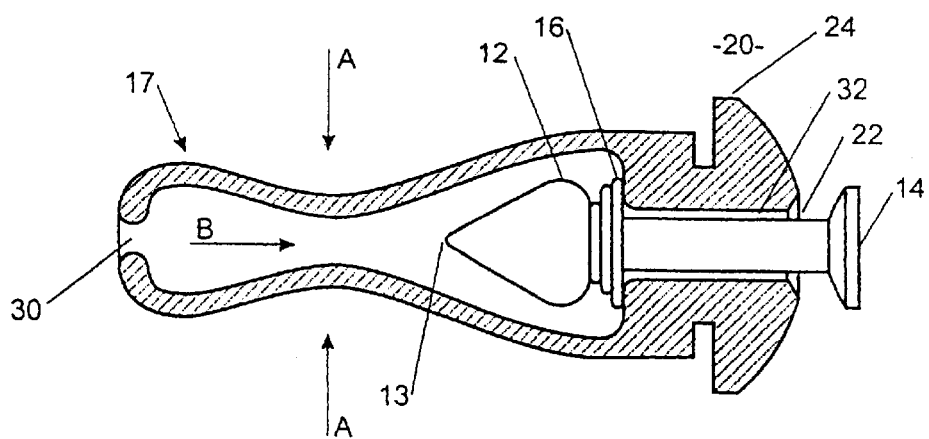
FIG. 3 shows a sectional side elevation view of the valve assembly of the present invention when located inside a teat and wherein the valve head is in an open position.

FIGS. 2 and 3 shows a preferred embodiment of the present invention wherein the valve assembly is substantially contained within an animal feeding teat 17. The valve assembly may be fitted inside the animal feeding teat 17 by passing the valve assembly piston head 12 first through the second aperture 22 and then through the guideway 32 until it is in the position as shown in FIG. 2.

The embodiment in the figures shows the teat fitted to an undefined receptacle 20. The teat may be fitted to an animal feeding bowl, a bottle, or a hose without departing from the scope of the invention. Fittings for use in hose types are well known in the dairying industry.

In the embodiment shown in FIG. 2, the animal feeding teat 17 is comprised of an outer casing 18 having a head portion 24, a shoulder portion 26 and a neck portion 28 between the head and shoulder portion. The outer casing 18 has a first aperture 22 and a second aperture 30. The valve head 14 of the valve assembly protrudes through the first aperture 22 at one end of the outer casing 18.

In the preferred embodiment shown in FIGS. 2 and 3, the animal feeding teat 17 is attached to a receptacle 20 (the boundary of which is shown by broken lines in FIGS. 2 and 3) at the end of the casing which contains the first aperture 22. The teat 17 may be passed from the outside of the receptacle, aperture end 22 first, through a circular hole in the receptacle 20 until the edge of the hole rests in a fluid—tight fit in neck portion 28 of teat 17. Alternatively, the teat is passed from the inside of the receptacle, aperture end 30 first through a circular hole in the receptacle until the edge of the hole rests in a fluid-tight fit in the neck portion 28 of the teat. As shown in FIGS. 2 and 3, the valve head 14 protrudes from the first aperture 22 and is located inside the receptacle 20.

The head and shoulder portion 24, 26 are solid apart from a guideway 32 through the centre. The piston shaft 10 moves freely within the guideway 32. The spring in conjunction with the convex valve head 14 act to keep the valve assembly in a centred position. The piston shaft is of a diameter small enough to allow fluid to flow freely through the guideway.

The receptacle 20 is intended to contain a liquid. The liquid may be milk or other animal feed. The liquid may comprise nutrients or medicinal supplements. In use, the valve head 14 is thus submerged in liquid within the receptacle 20, and the outer casing 18 may protrude from the receptacle substantially horizontally or downwardly. The valve assembly of the present invention will operate effectively when positioned at any angle.

The valve assembly of the present invention operates as follows. An animal exerts pressure in the direction of the arrows A by biting or squeezing the teat (see FIG. 3). This pressure forces the piston head 12 to move in the direction of the arrow B and compresses the biasing means 16. This in turn moves the valve head 14 away from the first aperture 22. In FIG. 3 the valve head 14 is thus unseated from the aperture 22. This allows the flow of liquid from the receptacle 20, through the first aperture 22 into the teat 17, then through the second aperture 30 and into the animal's mouth.

When the animal releases its bite and pressure is removed from the outer casing 18 and the piston head 12, the biasing means 16 forces the piston head 12 to move in the direction of the arrow E (see FIG. 2) and returns the valve head 14 to seat over the first aperture 22 and thus prevent the flow of liquid through the first aperture 22 and into the teat 17.

In an alternative embodiment it is the atmosphere that applies pressure in the direction of arrows A. This happens when a partial vacuum is created inside that teat as a result of an animal sucking on the teat. In the same manner as described above, the pressure forces the piston head 12 to move in the direction of the arrow B and compresses the biasing means 16. This in turn moves the valve head 14 away from the first aperture 22. In FIG. 3 the valve head 14 is thus unseated from the aperture 22. This allows the flow of liquid from the receptacle 20, through the first aperture 22 into the teat 17, then through the second aperture 30 and into the animal's mouth.

When the animal stops sucking the pressure differential dissipates, effectively removing the pressure from the outer casing 18 and the piston head 12, the biasing means 16 forces the piston head 12 to move in the direction of the arrow E (see FIG. 2) and returns the valve head 14 to seat over the first aperture 22 and thus prevent the flow of liquid through the first aperture 22 and into the teat 17.

The advantages of the valve assembly when contained within an animal feeding teat as described herein are as follows. The teat valve assembly of the present invention can operate effectively at any angle. It is not restricted to use in a vertical position as it is not reliant upon gravity forces to close the valve to prevent the flow of liquid from the teat.

A further advantage is that the teat valve assembly operates effectively even when there is a large aperture in the nipple of the teat. In traditional animal feeding teats that do not have a shut-off valve, only small apertures can be used in the teat nipple or liquid will spill out very easily. The advantage of such a large aperture in the nipple of the teat is that foreign bodies are less likely to get caught therein and thus the teat is more hygienic.

The teat valve assembly of the present invention is easy for animals, such as lambs or calves, to feed from. This is because the animal need only squeeze or bite the teat to start the flow of liquid. In comparison, many traditional teats require the animal to suck the teat or squeeze up and down on the teat to obtain liquid. The teat valve assembly will also operate to open the valve and allow the flow of liquid when the teat is pulled forcefully to the side.

It is envisaged that the valve assembly of the present invention could be inserted into any standard or conventional teat to operate. However, the present application describes a preferential embodiment of a teat into which the valve assembly of the present invention can be inserted.

Even if the outer teat becomes worn or damaged, the valve assembly will continue to operate and effectively, preventing the flow of liquid unless pressure is applied to the piston head. If the outer teat becomes completely destroyed, it is envisaged that the valve assembly could be recycled and placed in a new outer casing or teat.

Other embodiments of the invention will be apparent to those skilled in the art.

What is claimed is:

1. A combination of a valve assembly and an animal feeding teat,
said teat including:
an outer casing having a resiliently flexible teat part, the resiliently flexible teat part having two ends, one of said two ends being connectable to a source of fluid and the other of said two ends allowing the fluid to flow to feed an animal,
a first aperture located at the one end of the casing for communication with the source of fluid,
a second aperture located at the other end of the casing through which the fluid flows to feed the animal,
said valve assembly including:
a valve member including a piston shaft with a piston head located at a first end of said piston shaft and a valve head located at an opposite second end of the piston shaft, said piston shaft being moveably mounted relative to said teat so that said valve head of said valve member is seated against said first aperture on one side and said piston head is on an opposite side of said first aperture, and
a spring co-operable with said piston head,
said spring biasing said valve member so that said valve head normally covers said first aperture at least when said teat and valve assembly are in a substantially horizontal orientation, and allows pressure on said piston head against said spring from forces acting on said resiliently flexible teat part to unseat said valve head and open said first aperture to allow fluid to flow through said first aperture into said outer casing and subsequently out of said second aperture and closes said first aperture with a bias force when the forces acting on said resiliently deformable flexible teat part are removed.

2. The combination of claim 1, wherein said piston head is bulbous in shape.

3. The combination of claim 1, wherein the piston head is tapered at the end remote from the valve head.

4. The combination of claim 1, wherein said biasing means is a spring.

5. The combination of claim 1, wherein said spring is a coil spring.

6. The combination of claim 1, wherein said piston head contains at least one recess.

7. The combination of claim 1, wherein said piston shaft, piston head and valve head are formed as one unit.

8. The combination of claim 7, wherein the unit is comprised of nylon.

9. The combination of claim 1, wherein said teat is comprised of a durable pliant synthetic material.

10. The combination of claim 1, wherein said teat is comprised of rubber.

11. The combination of claim 1, wherein said spring biases said valve head to cover said first aperture when said piston shaft is in any orientation.

12. The combination of claim 3, wherein said piston head is substantially conical in shape.

13. The combination of claim 1, wherein said valve head bears directly against said casing to cover said first aperture.

* * * * *